Feb. 14, 1928.

J. A. ASKEW 1,659,510

DENTAL FACING AND BACKING

Filed March 25, 1926

Inventor
John A. Askew
By
*(attorney signature)*
Attorney

Patented Feb. 14, 1928.

1,659,510

UNITED STATES PATENT OFFICE.

JOHN A. ASKEW, OF LITTLE ROCK, ARKANSAS.

DENTAL FACING AND BACKING.

Application filed March 25, 1926. Serial No. 97,349.

This invention relates to new and useful improvements in teeth, with particular reference to interchangeable facings and backings.

One of the objects of the invention is to construct the facing so that the occlusal edge thereof is relieved from the strain of mastication, said strain being borne by the backing.

Another object of the invention is the provision of transverse inter-engaging shoulders on both backing and facing, definitely allocating the position of the latter with respect to the backing, assuring it against being displaced toward the base of the tooth while in use.

A further object of the invention is the provision of a dovetailing wedge and groove formed respectively in the backing and facing designed to prevent lateral movement of the facing and at the same time locking it to the facing, said wedge and groove tapering toward the apical edge of the tooth at the same angle as the bevel at the lower edge of the facing between the facing and backing, so that the facing can readily be slid into position and secured to the backing, without removing the latter from its permanent mounting in the mouth of the patient.

Still another object of the invention is the provision of an extension or tip at the end of the wedge on the backing, said tip intersecting the thinner part of the facing caused by the undercutting of the facing to form the transverse shoulder hereinbefore referred to, reinforcing the facing against breakage along this line of relative weakness.

Other objects will appear as the following description of a preferred embodiment thereof proceeds.

In the drawings:—

Figure 1:
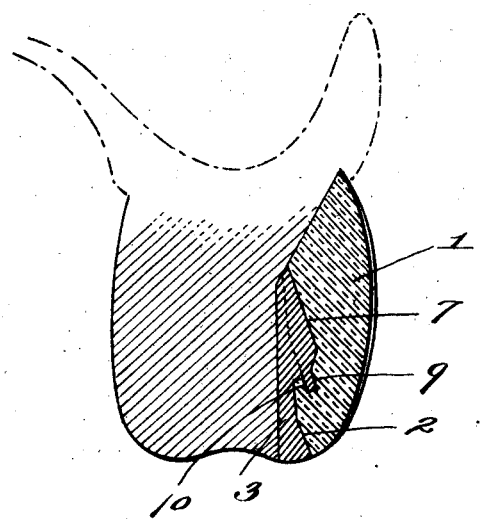
Fig. 1 is a cross section through a tooth embodying the principle of the present invention.
Figure 2:
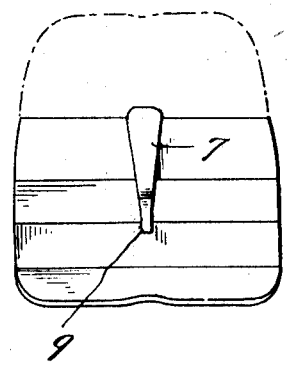
Fig. 2 is a front elevation of the backing.
Figure 3:
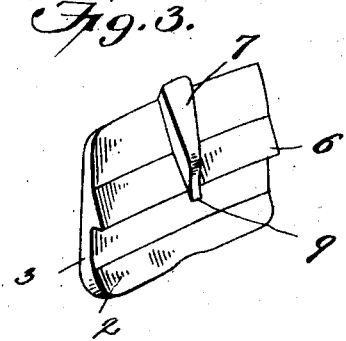
Fig. 3 is a perspective view of the backing.
Figure 4:
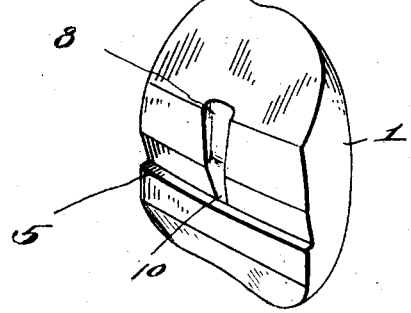
Fig. 4 is a perspective view of the facing seen from the rear.

Referring now in detail to the several figures, the numeral 1 represents the facing which may be of porcelain and is beveled adjacent its cutting edge, as shown at 2, to permit the backing 3 to extend forwardly to the cutting edge on the occlusal face of the tooth, for the purpose of having the backing receive the direct stress incident to mastication thereby relieving the facing from strain thereby obviating the hazard of having it broken in the mouth.

The facing and backing are formed with transverse interengaging shoulders 5 and 6 which definitely allocates the facing with respect to the backing, the shoulder on the backing overhanging that upon the facing, thereby constituting positive means to prevent the accidental displacement of the facing toward the base of the tooth.

The backing is provided with a wedge 7 tapered in a direction toward the occlusal face of the tooth, and the facing is formed with a corresponding groove 8 forming a seat for said wedge. The wedge and groove are both undercut laterally so that the wedge dovetails into the groove securely locking the facing to the backing. The interengagement of the wedge and groove also ensures the said parts against relative lateral displacement.

It will be noted that the front face of the wedge 7 tapers at the same angle as the angle of the bevel 2. This makes it possible to replace the facing while the denture to which the backing is attached, is in the mouth of the patient, the replacement being accomplished simply by pushing the new facing upward and toward the backing so that the wedge 7 slips into its seat in the groove 8, it being understood that cement has previously been applied to the contacting surfaces of at least one of said parts.

The wedge 7 is formed with an extension or tip 9 projecting from its smaller end and intersecting the plane of the shoulder thereby crossing the region of relative thinness established in the facing by undercutting the same to form the shoulder. The tip extends into the socket 10 in the facing within which it is suitably embedded, said socket constituting a reinforcement for the facing at said line of weakness. The wedge and tip are tapered on the forward side to prevent the metal coming so close to the front surface of the porcelain as to be reflected through it.

While I have herein described what I believe to be a preferred and practical embodiment of my invention it is to be understood that various changes in the arrangement and proportions of the parts may be made as the dictates of usage may require and still be within the terms of the appended claims.

Having described my invention what I claim as new and desire to secure by Letters Patent, is:—

1. In an artificial tooth, a facing having a portion of its inner side cut away transversely of its width at an angle to its inner side to form a transverse shoulder directed toward the base of the tooth, said facing also having a longitudinal wedge-shaped groove formed on its inner side and tapering toward said shoulder, said groove terminating at its lower end in a socket below said shoulder and a backing having a downwardly inclined portion projecting from its front face and extending transversely of said face to form a shoulder interengaging the shoulder of said facing, said backing also having a wedge projecting from its front face and seating in said groove, said wedge intersecting the relatively weak part of said facing adjacent said shoulder and having a tip at its free end extending into said socket, said facing being formed with a transverse beveled portion extending forwardly toward the cutting edge of said facing substantially parallel to the face of said cut-away portion, and the backing being formed with a forwardly extending lower end beveled approximately parallel to the inclination of said projecting inclined portion to match the bevel in said facing, the forward face of said wedge being inclined with the same angularity as that of said matching bevels.

2. An artificial tooth comprising complementary facing and backing members adapted to be united by cement along matching faces which form an indented joint, the backing having a transverse apical edge portion inclining downwardly and away from the body of the backing, an intermediate transverse portion inclined in the same direction and at the same angle, turning downwardly in an abrupt downwardly facing shoulder, and a projecting wedge extending substantially in a direction from the base to apex of the tooth having the upper face thereof inclined in the same direction and at the same angle as the other described inclined surfaces, the facing having complementary inclined surfaces.

In testimony whereof I have hereunto set my hand.

JOHN A. ASKEW.